US005264291A

United States Patent [19]

Shinozaki

[11] Patent Number: 5,264,291

[45] Date of Patent: Nov. 23, 1993

[54] IMAGE-FORMING MATERIAL AND IMAGE-FORMING METHOD EMPLOYING THE SAME

[75] Inventor: Fumiaki Shinozaki, Shizuoka, Japan

[73] Assignee: Fuji Photo Film Co., Ltd., Kanagawa, Japan

[21] Appl. No.: 613,031

[22] Filed: Nov. 15, 1990

[30] Foreign Application Priority Data

Nov. 15, 1989 [JP] Japan .................................. 1-296611

[51] Int. Cl.[5] ................................................ B32B 9/00

[52] U.S. Cl. ...................................... 428/513; 428/40; 428/195; 428/500; 428/913

[58] Field of Search ................. 428/195, 40, 913, 914, 428/500, 513

[56] References Cited

U.S. PATENT DOCUMENTS 5,034,280 7/1991 Gotoh et al. ........................ 428/195

FOREIGN PATENT DOCUMENTS 01-037872 2/1989 Japan .
02-173650 7/1990 Japan .

*Primary Examiner*—Patrick J. Ryan
*Assistant Examiner*—W. Krynski
*Attorney, Agent, or Firm*—Sughrue, Mion, Zinn, Macpeak & Seas

[57] ABSTRACT

An image-forming material is disclosed, which comprises (a) an insulating support having provided thereon (b) an electroconductive layer and (c) a dielectric layer, in this order, the image-forming material being provided with a second dielectric layer on the surface of (c) away from the support, or between (b) and (c), or between (a) and (b), and the second dielectric layer being peelable from an adjacent layer. An image-forming method employing the image-forming material is also disclosed, which comprises steps of forming an electrostatic latent image in accordance with an electric signal, forming a visible image by use of a toner, bringing the face carrying the visible image into contact with a final support, and transferring the visible image together with the dielectric layer or the dielectric layer and the layer(s) further from the support than the dielectric layer by heating and pressing.

15 Claims, No Drawings

IMAGE-FORMING MATERIAL AND IMAGE-FORMING METHOD EMPLOYING THE SAME

FIELD OF THE INVENTION

The present invention relates to an image-forming material which converts an electric signal directly into an electrostatic latent image, and to an image-forming method employing the image-forming material. The present invention particularly relates to an image-forming material and an image-forming method which are useful in fields such as display, design, drawing, and direct digital color proof, and are suitable chiefly for forming a color image on an intended final support.

BACKGROUND OF THE INVENTION

An electrostatic recording film is known which is constituted of an insulating film, an electroconductive layer, and a dielectric layer laminated successively. In electrostatic recording, a recording voltage is applied to a multi-pin electrode head (hereinafter referred to as a "pin electrode") to cause gaseous discharge in a minute space between the pin electrode and the electrostatic recording film (hereinafter referred to as a "gap"), thereby forming an electrostatic latent image on the surface of the dielectric layer, and then the latent image is developed with a toner to produce a visible image. Such methods are described, for example, in JP-B-49-34150, JP-B-49-46942 (corresponding to U.S. Pat. No. 3,849,188), JP-B-50-32617 (corresponding to U.S. Pat. No. 3,849,188), JP-B-51-37777, JP-B-57-8464 (corresponding to U.S. Pat. No. 4,203,764), JP-B-58-27494 (corresponding to U.S. Pat. No. 4,275,103), JP-B-57-36584, JP-B-58-25242, JP-B-58-27501, JP-B-58-28574 (corresponding to U.S. Pat. No. 4,275,103) and JP-B-58-28576 (the term "JP-B" as used herein means "examined Japanese Patent Publication"), JP-A-55-500394 (PCT), JP-A-57-147639, JP-A-57-211156, JP-A-58-154847, JP-A-60-33560, JP-A-60-57346, JP-A-52-113224, JP-A-55-33134 (corresponding to U.S. Pat. No. 4,374,895), JP-A-56-38052, JP-A-60-242460, JP-A-61-143761 (corresponding to U.S. Pat. No. 4,275,103), JP-A-61-156051, JP-A-54-159232, JP-A-57-133454 (corresponding to U.S. Pat. No. 4,389,451), JP-A-63-50846, JP-A-63-60452 and JP-A-2-40623, and Japanese Patent Application Nos. 1-168898, 1-189041 and 1-189042.

Electrostatic recording systems, which form a color image directly from an electric signal are needed increasingly in various fields of application, and are of interest particularly in the fields of display, design, drawing, color-proof, and others because of the possibility of larger sizes and the possibility for lower cost of image formation.

The system of prior art, however, when an image is to be formed on a support such as a metal plate, a glass plate, a wood board, a paper sheet, a synthetic film, and the like, require a coated layer depending on the support before the image is formed, and the transparency of the recording layer is not satisfactory.

SUMMARY OF THE INVENTION

The present invention intends to provide an electrostatic image-forming material which is free from the above-mentioned disadvantages and which forms a color image by transfer on an intended final support.

The present invention also provides a method for forming an image by use of the following materials.

The present invention provides an image-forming material comprising (a) an insulating support having provided thereon (b) an electroconductive layer and (c) a dielectric layer in this order, the image-forming material being provided with a second dielectric layer on the surface of (c), or between (b) and (c), or between (a) and (b), the second dielectric layer being peelable from an adjacent layer thereof.

The present invention also provides an image-forming method employing the image-forming material.

DETAILED DESCRIPTION OF THE INVENTION

The insulating support, the electroconductive layer, and the dielectric layer may be any of the known ones disclosed in the above-mentioned patent publications.

The peelable second dielectric layer may be provided, as described above, on the upper face of the layer c), between the layers of (c) and (b), or between the layer (b) and the support (a). In the case where a color image of high transparency is desired to be formed onto the final support, the second dielectric layer is preferably provided on the upper face of the layer (c). The second dielectric layer may be provided as two or more layers, and two or more second dielectric layers may be provided at any of on the surface of (C), between (b) and (c), and between (a) and (b).

The material for forming the peelable second dielectric layer is a substance which is peelable from (c), between (c) and (b) or between (b) and (a). In case where the second dielectric layer is provided on the upper face of the layer (c), the material is preferably having heat-adhesive property to the final support (particularly, heat-adhesive property at the temperature of from 50° to 150° C.) as well as it is peelable from (c). Substantially transparent substances are preferred as the material for forming the second dielectric layer. The substance to be used as the material for forming the second dielectric layer should not be one which may deteriorate the electrostatic properties of the layers (a), (b) and (c). Although the material for forming the second dielectric layer can be selected depending upon the kind of material used in the layer (a), (b) or (c) or the thickness of the second dielectric layer, watersoluble resins or water-swelling resins are not preferred.

Specific examples of the material for forming the peelable second dielectric layer include polyolefins such as polyethylene, polypropylene, ionomers thereof and the like; ethylene copolymers such as ethylene-vinyl acetate and the like; polyesters, polyesteramides, polyvinyl chloride and copolymers thereof, polyvinylidene chloride and copolymers thereof, polymethacrylate esters and copolymers thereof, polyamides, polyvinyl acetate and copolymers thereof, polyurethanes, polystyrene and copolymers thereof, polycarbonate, alkyd resins, polyvinylacetal, polyvinylbutyral, polymethylpentene, synthetic rubbers, chlorinated rubbers (preferably, one having chlorination degree of 65 to 75%), cellulose acetate butyrate, and mixtures of these resins and rubbers. The materials may be formed into a single layer or multiple layers in consideration of peeling property from the materials of (a), (b) or (c).

The thickness of the second dielectric layer is selected to achieve a desired dielectric and optical properties and may be selected from within a broad range, usually from about 0.3 μm to 5.0 μm, preferably from about 0.5 μm to 3 μm.

The second dielectric layer may contain an additive such as a surface active agent for improving surface properties, an electric charge-controlling agent, a matting agent, a tackifier for improving adhesion to a final support, a moisture absorbent, and the like.

The final support includes various materials such as metal plates, wood boards, glass plates, papers, and synthetic films. The final support may be provided with an adhesive layer on its surface, if necessary.

Employing the image-recording material of the present invention, a multi-color image can be formed by a method described below.

Firstly, an electrostatic latent image corresponding to a first color is formed in accordance with an electric signal, and then the latent image is developed by using toner to form a visible image. This process is repeated with toners of different colors to form a multicolor toner image on the image-recording material. Subsequently, the face of the toner image is brought into contact with the face of a final support, and the image is transferred onto the final support, together with the second dielectric layer, or the dielectric layer and layer(s) further from the support than the second dielectric layer, by heating, and pressing.

In this method, the toner forming the image is transferred 100% onto the final support, giving a color image in high reproducibility.

The present invention is described in more detail referring to examples without limiting it in any way. Unless otherwise indicated, all parts, percents and ratios are by weight.

EXAMPLE

An image-forming material of the present invention was prepared as described below.

A polyethylene terephthalate film which had been biaxially oriented and thermally fixed was subjected to glow discharge treatment. Thereon, the liquid having the composition below was applied as the electroconductive layer, and dried at 130° C. for 10 minutes to give the thickness of 1 μm.

| | |
|---|---|
| Gelatin | 15 parts by weight |
| Tin oxide doped with antimony (Amount of antimony being 5% based on tin oxide, Average diameter of tin oxide being 0.2 μm) | 55 parts by weight |
| Sodium salt of 2,4-dichloro-6-hydroxy-s-triazine | 0.03 part by weight |
| Water | 1000 parts by weight |

On this layer, the liquid having the composition below was applied as the first dielectric layer and dried at 100° C. for 10 minutes to give a dry thickness of 1.75 μm. The thickness of 1.75 μm is an average thickness of the portion of the dielectric layer where an insulating particle is not present. The liquid for the above dielectric layer was prepared as follows. To a mixture of:

| | |
|---|---|
| Linear polyester (VYLON 200, trade name, manufactured by Toyobo Co.) | 37.4 parts by weight |
| Methyl ethyl ketone | 37 parts by weight |
| Toluene | 243 parts by weight, |

0.37 part by weight of an electroconductive powders (electroconductive powder T-1, trade name, manufactured by MITSUBISHI METAL CORP., not more than 0.1 μm in particle diameter, spheric, having specific resistance of $10^{-1}$ to $10^{1}$ Ω·cm) was added and dispersed at a rotation speed of 10,000 rpm for 20 minutes by means of a homogenizer (AM-3, trade name, manufactured by Nippon Seiki K.K.). Further to this dispersion, 10.8 parts by weight of an insulating grains (UNISTOLE R100K, trade name, a 20% dispersion of polypropylene having an average particle diameter of 9.0 μm in toluene, manufactured by Mitsui Petrochemical Industries, Ltd.) was added.

Further on this layer, the liquid having the composition below was applied to give the second dielectric layer of a dry thickness of 1.0 μm.

| | |
|---|---|
| Poly(vinyl acetate-co-crotonic acid) (molar ratio: 95/5) | 8 parts by weight |
| Cellulose acetate butyrate | 2 parts by weight |
| Methanol | 80 parts by weight |
| Acetone | 80 parts by weight |
| Methylcellosolve | 40 parts by weight |

On the image-forming material prepared as described above, images in cyan, magenta, yellow, and black were formed by means of a color electrostatic plotter, CE3444 (trade name, manufactured by Versatec Co.), through signals made from a colored original copy by color separation of a planar scanner, XS-12C (trade name, manufactured by Fuji Xerox Co.). The toners used were liquid-development toners for CE3000 (manufactured by VERSATEC CO.).

A final color image was formed with high reproducibility on a sheet of art paper by superposing the image-forming material carrying the color images onto a sheet of art paper, transferring the images by a color art transfer machine 680T (trade name, manufactured by Fuji Photo Film Co., Ltd.), and peeling off the image-forming material, thereby transferring the color images together with the second dielectric layer, i.e., of the uppermost layer.

While the invention has been described in detail and with reference to specific examples thereof, it will be apparent to one skilled in the art that various changes and modifications can be made therein without departing from the spirit and scope thereof.

What is claimed is:

1. An image-forming material comprising (a) an insulating support having provided thereon (b) an electroconductive layer, (c) a first dielectric layer, and (d) a second dielectric layer, in this order, the second dielectric layer being peelable from the first dielectric layer.

2. An image-forming material as in claim 1, wherein said second dielectric layer is comprised of a material selected from the group consisting of, ethylene copolymers, polyesters, polyesteramides, polyvinyl chloride and copolymers thereof, polyvinylidene chloride and copolymers thereof, polymethacrylate esters and copolymers thereof, polyamides, polyvinyl acetate and copolymers thereof, polyurethanes, polystyrene and copolymers thereof, polycarbonate, alkyd resins, polyvinylacetal, polyvinylbutyral, polymethylpentane, synthetic rubbers, chlorinated rubbers, cellulose acetate butyrate, and mixtures of these resins and rubbers.

3. An image-forming material as in claim 1, wherein the thickness of said second dielectric layer is from about 0.3 μm to 5.0 μm.

4. An image-forming material as in claim 1, wherein said second dielectric layer is a layer capable of being released from an adjacent layer upon application of heat.

5. An image-forming material as in claim 1, wherein said second dielectric layer is comprised of polyolefins and ionomers thereof.

6. An image-forming material comprising (a) an insulating support having provided thereon (b) an electroconductive layer, (c) a first dielectric layer, and (d) a second dielectric layer, in this order, the first dielectric layer being peelable from the electroconductive layer.

7. An image-forming material as in claim 6, wherein said first dielectric layer is comprised of a material selected from the group consisting of ethylene copolymers, polyesters, polyesteramides, polyvinyl chloride and copolymers thereof, polyvinylidene chloride and copolymers thereof, polymethacrylate esters and copolymers thereof, polyamides, polyvinyl acetate and copolymers thereof, polyurethanes, polystyrene and copolymers thereof, polycarbonate, alkyd resins, polyvinylacetal, polyvinylbutyral, polymethylpentane, synthetic rubbers, chlorinated rubbers, cellulose acetate butyrate, and mixtures of these resins and rubbers.

8. An image-forming material as in claim 6, wherein the thickness of said first dielectric layer is from about 0.3 μm to 5.0 μm.

9. An image-forming material as in claim 6, wherein said first dielectric layer is a layer capable of being released from the electro conductive layer upon application of heat.

10. An image-forming material as in claim 6, wherein said second dielectric layer is comprised of polyolefins and ionomers thereof.

11. An image-forming material comprising (a) an insulating support having provided thereon (b) a first dielectric layer, (c) an electroconductive layer and (d) a second dielectric layer, in this order, the first dielectric layer being peelable from the support.

12. An image-forming material as in claim 11, wherein said first dielectric layer is comprised of a material selected from the group consisting of ethylene copolymers, polyesters, polyesteramides, polyvinyl chloride and copolymers thereof, polyvinylidene chloride and copolymers thereof, polymethacrylate esters and copolymers thereof, polyamides, polyvinyl acetate and copolymers thereof, polyurethanes, polystyrene and copolymers thereof, polycarbonate, alkyd resins, polyvinylacetal, polyvinylbutyral, polymethylpentane, synthetic rubbers, chlorinated rubbers, cellulose acetate butyrate, and mixtures of these resins and rubbers.

13. An image-forming material as in claim 11, wherein the thickness of said first dielectric layer is from about 0.3 μm to 5.0 μm.

14. An image-forming material as in claim 11, wherein said first dielectric layer is a layer capable of being released from said support upon application of heat.

15. An image-forming material as in claim 11, wherein said first dielectric layer is comprised of polyolefins and ionomers thereof.

* * * * *